United States Patent [19]

Gelston, II

[11] 4,419,883
[45] Dec. 13, 1983

[54] LEAK DETECTOR

[76] Inventor: N. E. Gelston, II, 7 Orchard Rd., Skaneateles, N.Y. 13152

[21] Appl. No.: 353,609

[22] Filed: Mar. 1, 1982

[51] Int. Cl.³ .............................................. G01M 3/10
[52] U.S. Cl. ..................................... 73/49.3; 73/45.5; 324/58.5 B; 324/58.5 C
[58] Field of Search ...................... 73/40, 40.5 R, 41.2, 73/41.3, 41.4, 45.5, 45.8, 861.41, 49.2, 49.3; 324/58.5 B, 58.5 C

[56] References Cited

U.S. PATENT DOCUMENTS

| 2,967,450 | 1/1961 | Shields et al. | 73/861.41 |
| 3,114,257 | 12/1963 | Foster et al. | 73/45.5 |
| 3,813,922 | 6/1974 | Oswald et al. | 73/49.2 |

FOREIGN PATENT DOCUMENTS 1927551  1/1970  Fed. Rep. of Germany ....... 73/49.2

Primary Examiner—S. Clement Swisher
Attorney, Agent, or Firm—Bruns & Jenney

[57] ABSTRACT

A system for detecting small leaks at low pressures in hermetically sealed units that includes a first flow circuit for connecting a test unit to a source of pressurized gas (air) to place the unit at a desired test pressure. The gas (air) is then rerouted through a second flow circuit containing a bubble chamber so that in the event of a leak, a stream of bubbles are produced in a liquid. The presence of bubbles in the liquid is detected by a doppler radar which provides an alarm signal in response thereto. The mass displacement of the bubbles within the liquid is controlled and the time period between bubbles is sensed to provide sufficient data to quantify the leak rate.

16 Claims, 3 Drawing Figures

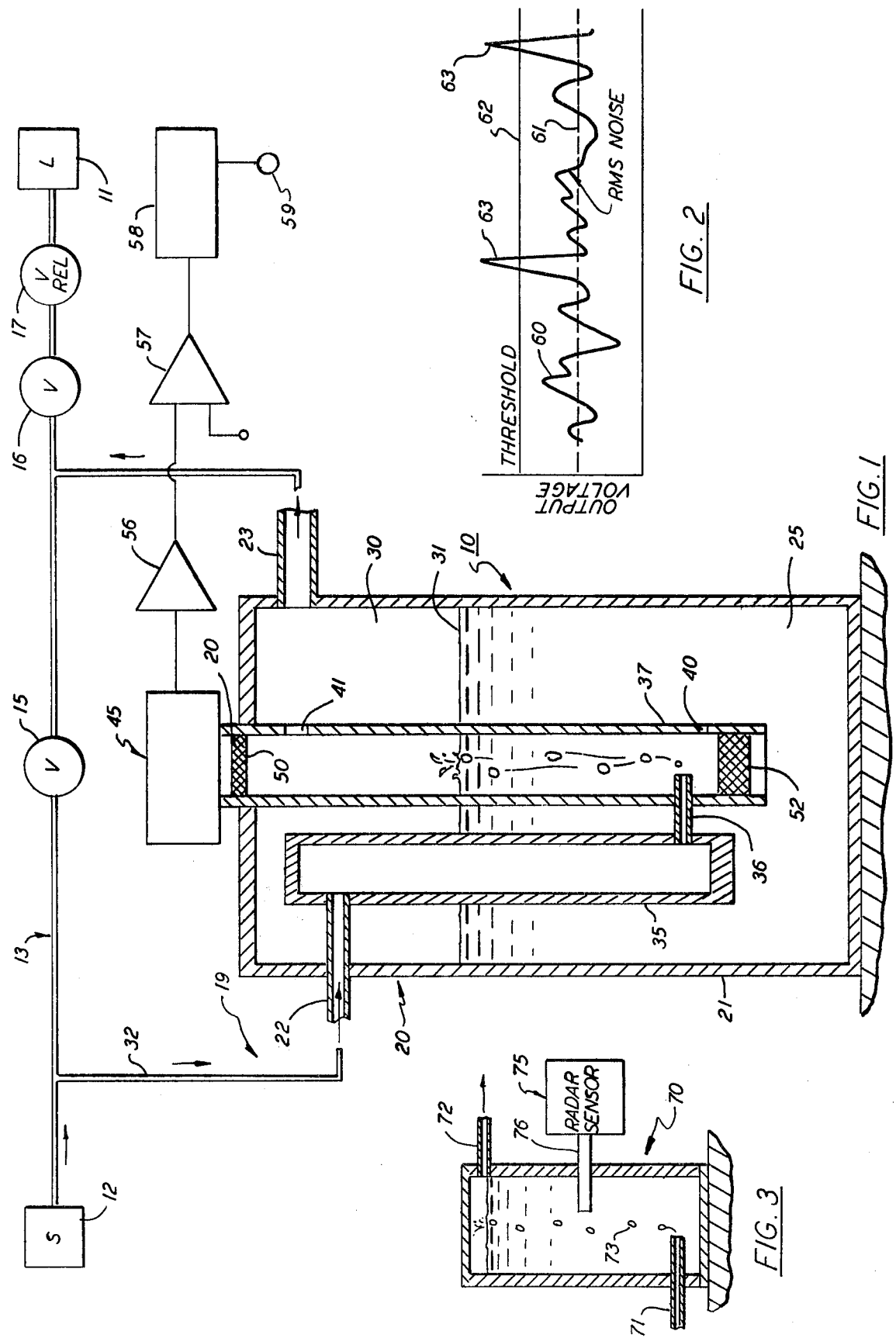

LEAK DETECTOR

BACKGROUND OF THE INVENTION

This invention relates to an improved leak detector and, in particular, to a leak detector that utilizes electromagnetic signals to accurately discern the unwanted escape of a fluid (gas) from a hermetically sealed unit. More specifically, the present invention involves a highly sensitive leak detector that is able to sense the present of minute leaks in a relatively short period of time.

Some leak detectors that are presently in use rely upon a pressure decay principle to discern leaks in hermetically sealed units. Initially, the unit is pressurized using air or some type of gas to a relatively high test pressure. The pressure within the unit is then monitored over a period of time. In the event of a leak, a decrease in the unit pressure will be sensed provided it is within the sensitivity range of the test equipment. Ordinarily, this type of equipment will not be able to detect leaks below 5 cc/min. even when utilizing test pressures of about 300 psi.

Another type of leak detector relies upon a flow monitor to discern the loss of fluid from sealed test units. Here again, a gas or liquid under relatively high pressure is initially brought into the test unit. If a leak is present, more fluid must be supplied to the unit to maintain equilibrium conditions. A flow sensor is provided in the fluid supply line that will detect the flow of make-up fluid into the unit. The detecting system, however, is only as sensitive as the flow sensor and, as a consequence, relatively small leaks can not generally be detected, particularly at low test pressures.

SUMMARY OF THE INVENTION

It is therefore an object of the present invention to improve leak detection systems.

A further object of the present invention is to sense the presence of small leaks in a hermetically sealed unit within a short period of time.

A still further object of the present invention is to decrease the cost of carrying out leak detecting tests.

Another object of the present invention is to provide a leak detection system that utilizes electromagnetic radiation to sense the presence of minute leaks in sealed test units.

Yet another object of the present invention is to provide a highly sensitive leak detecting system that is capable of operating at extremely low test pressures.

A still further object of the present invention is to provide a leak detecting system that allows calibrated flow rates to be quantified.

These and other objects of the present invention are attained by means of a detecting system that includes a source of gas (air) under pressure, a first flow circuit for connecting the source to a test unit to bring the pressure of the unit to a desired test pressure, a second flow circuit for rerouting gas (air) from the source through a bubble chamber prior to delivery to the test unit whereby, in the event of a leak, a stream of bubbles will be produced in a liquid, a detector using electromagnetic signals for sensing the presence of bubbles in the liquid and generating an alarm signal in response thereto. The mass displacement of liquid by each bubble is controlled by a gas (air) metering device and the number of bubbles generated per unit of time are counted to provide quantitative data concerning the leak rate.

BRIEF DESCRIPTION OF THE DRAWINGS

For a better understanding of these and other objects of the present invention reference is had to the following detailed description of the invention that is to be read in conjunction with the accompanying drawings, wherein:

FIG. 1 is a side elevation diagrammatically illustrating a leak detection system embodying the teachings of the present invention wherein the detector senses the presence of disturbances upon the surface of a liquid.

FIG. 2 illustrates the voltage envelope of the detector's output showing target information being electrically isolated from receiver noise; and FIG. 3 is a further embodiment of the present invention showing the detector arranged to sense the presence of bubbles beneath the surface of the liquid.

DESCRIPTION OF THE INVENTION

Referring initially to the diagram of FIG. 1, there is shown a leak detection system, generally referenced 10, that is connected to a test unit or load 11. The test load may be any hermetically sealed piece of equipment, the integrity of which must be assured prior to the equipment being placed in service. One such test application involves radiators used in the automotive industry for providing cooling fluid to an internal combustion engine. Because of the typical radiator design, this type of test must oftentimes be carried out at relatively low test pressures in order to avoid damaging the relatively weak tube joints and the like. As a consequence, many of the prior art systems can not be effectively utilized in this environment and those that can are prohibitively slow acting. As will become evident from the disclosure below, the present detecting system can be used effectively in most low pressure applications to sense extremely small leaks in a short period of time. Leak rates of about 0.05 cc/min. have been detected in about 10 seconds at test pressures of about 20 psi utilizing the present system.

The test load is connected directly to an air source 12 via a first flow circuit designated 13. Although air is used as a test fluid in the preferred embodiment of the invention, any suitable gas or liquid can be similarly employed without departing from the teachings of the present invention. The air supply may be provided simply by filtering and clearing "shop air". The pressure of the air is also reduced to the desired test pressure and delivered from the supply through the first flow circuit. The first flow circuit contains a pair of automatically operated control valves 15 and 16, and a relief valve 17. As will be explained in greater detail below, the valves are selectively positioned to route air directly to the test load or alternatively, through a second flow circuit, generally referenced 19, containing a bubble chamber 20.

The bubble chamber 20 includes a gas-tight housing 21 having an air inlet 22 and an air outlet 23 passing through the sidewall thereof. A liquid 25 is contained within the housing which partially fills the interior thereof to establish an air space 30 over the surface of the liquid.

The air inlet 22 connects into the first flow circuit on the downstream side of conttol valve 15 by means of air supply line 32. The air inlet is arranged to discharge into a vertically aligned plenum 35 that passes downwardly into the liquid. Air from the plenum is metered into an adjacent waveguide 37 by means of a bubble-generating tube 36. In assembly, the waveguide is partially immersed in the fluid and contains a liquid entry port 40 adapted to allow the liquid to freely enter the waveguide. The upper section of the waveguide passes out of the top wall 39 of the housing and contains an exhaust port 41 that communicates with the air space 30 over the liquid.

The air outlet 23 of the housing is connected back into the first flow circuit between the two control valves 15 and 16 thereby completing the second or bubble chamber circuit. Air diverted from the first flow circuit is initially delivered into the plenum 35 and is then metered into the waveguide below the liquid level by the bubble generator tube 36. As a result, air moving through the housing will cause a stream of bubbles to be established within the waveguide that rise to the surface of the liquid along a well-defined path of travel.

A radar unit 45 that utilizes the doppler effect to identify targets is mounted upon the top wall 39 of the housing. The unit is operatively connected to the waveguide to both transmit and receive electromagnetic signals travelling along the guide. A signal-penetratable seal 50 is mounted across the top section of the guide which prevents fluids from escaping from the structure and random noise from entering. The opposite or lower end of the waveguide is also closed by means of a tuning slug 52. The slug, in assembly, is positioned a predetermined distance from the entrance to the waveguide that is some multiple of the quarter-wavelength measurement of the radar transmitter frequency. The tuning device physically isolates the bubble path and provides for maximum returns on targets within the waveguide and, in particular, disturbances upon the surface of the liquid.

Because the radar operates on a doppler principle, the transmitter and receiver can be operated simultaneously to identify targets that are relatively close to the transmitter. The transmitter is directed at the surface of the liquid so that bubbles breaking through the surface will create a return that can be identified by the radar system. The voltage envelope 60 of the return signal is illustrated in FIG. 2 wherein output voltage is plotted against time. Dotted line 61 represents the rms noise voltage while solid line 62 represents the desired threshold signal level. Return signals produced by bubble-induced surface disturbances will contain a frequency component relative to bubble velocity and an amplitude component relative to the mass displacement of the bubbles. The present system utilizes the amplitude component to detect the presence of bubbles within the waveguide.

In operation, the return signal from the radar unit is first amplified within a conventional amplifier 56 and then applied to a comparator 57. A desired threshold level is also applied to the comparator so that only target signals 63 (FIG. 2) which are above this level are passed on to counter 58. The counter is used to generate an alarm signal at 59 and also to provide data concerning the time period between bubble-induced surface disturbances.

To detect a leak within a test load, the valves are initially positioned to deliver air via the first flow circuit directly into the test unit to bring the pressure of the unit up to the desired test pressure. Once equilibrium is established, control valve 15 is closed and air from the air supply is rerouted through the second flow circuit.

In the event of a leak, make-up air to the test unit must now pass through the bubble chamber producing a stream of bubbles within the wave-guide. Bubble-induced disturbances are detected by the radar and an alarm signal is generated in response thereto.

The mass displacement of each bubble is controlled by the bubble generating tube 36. By knowing the bubble size and the time required to generate each bubble, the leak rate can be quantified to provide accurate leak data. As noted, because of the very high sensitivity of the electronic detector and the bubble-integrating design, the instant system can accurately detect leaks down to 0.05 cc/min. in about ten seconds utilizing test pressures as low as 20 psi.

After completion of the test, control valve 16 is also closed thus isolating the test load from the bubble chamber and the air supply. The relief valve 17 is then opened to place the test load at ambient pressure and the unit is decoupled from the test system and the valves conditioned to initiate a new test cycle.

Turning now to FIG. 3, there is shown a second embodiment of the present invention. As in the main embodiment, a first flow circuit containing the described control and relief valves is used to bring air into a test unit. A second flow circuit is also employed to bring make-up air to the test unit through a bubble chamber 70 that is partially filled with a liquid to provide an air space over the liquid. Diverted air from the supply is metered directly into the chamber below the liquid level by means of a bubble generator tube 71. In the event of a leak, a stream of bubbles 73 rises along a prescribed path of travel to the top of the liquid and is released from the chamber via outlet 72.

In this embodiment, a waveguide 76 is passed horizontally through the side wall of the chamber into the liquid and the exit face of the guide is pointed at the bubble path. Fluid seals are again positioned within the guide to prevent the escape of liquid from the chamber but which permits electromagnetic energy from radar unit 75 to pass freely therealong. In this environment, the radar is arranged to detect the actual movement of the bubbles through the liquid and again generate an alarm signal in response thereto.

While this invention has been described with reference to the details as set forth above, it is not limited to the specific structure as disclosed and the invention is intended to cover any modifications or changes as may come within the scope of the following claims.

I claim:

1. A method of detecting leaks in a hermetically sealed unit that includes the steps of
providing a source of gas at a predetermined test pressure that is above ambient pressure,
connecting the source to the unit by means of a first flow circuit whereby the internal pressure of the unit is equal to the test pressure,
rerouting gas from the source to the unit through a second flow circuit containing a bubble chamber whereby, in the event of a leak, a path of bubbles is established in a liquid,
at least partially immersing a waveguide connected to a radar unit in said liquid,
transmitting radar signals along the waveguide at the bubble path in said chamber,
detecting changes in the transmitted signals produced by the movement of bubbles in the liquid that are returned along said waveguide, and producing an output signal in response to the detection of bubbles in the liquid.

2. The method of claim 1 that further includes the step of controlling the mass displacement of the bubbles generated within the chamber.

3. The method of claim 1 that includes the further step of comparing the output signal to a predetermined threshold level and generating an alarm signal if the output signal is above said threshold level.

4. The method of claim 3 that further includes the step of determining the time period between detected bubbles whereby the leak rate can be quantified.

5. The method of claim 1 that further includes the step of tuning the waveguide to detect disturbances produced by the bubbles upon the surface of the liquid by said bubbles.

6. The method of claim 5 that includes the step of closing the distal end of the waveguide with a tuner that is positioned at a distance that is some multiple of one-quarter of the transmitted signal frequency from the entrance of the waveguide.

7. Apparatus for detecting leaks in a hermetically sealed unit that includes
 a source of gas at a predetermined test pressure,
 a first flow circuit for delivering gas from said source to said unit to raise the internal pressure of the unit to said test pressure,
 a second flow-circuit for rerouting gas from said source through a bubble chamber prior to delivering said gas to said unit,
 said bubble chamber being partially filled with a liquid and having a gas inlet positioned below the surface of said liquid and a gas outlet positioned above the surface of said liquid whereby gas moving through the chamber rises through the liquid along a defined path of travel,
 electromagnetic detecting means for sensing the presence of bubbles within the liquid and providing an output signal in response thereto, said electromagnetic detecting means includes a doppler type radar unit and further includes a waveguide operatively connected to the unit that is at least partially immersed in the liquid for directing transmitted signals from said radar unit at the bubble path and returning echo signals to said unit, and
 valve means for selectively routing gas from said source through said first and second flow circuit means.

8. The apparatus of claim 1 that further includes a comparator means connected to the output of the radar unit for generating an alarm signal when the output of the radar unit exceeds a predetermined threshold level.

9. The apparatus of claim 8 that further includes a counter means connected to the output of the comparator means for recording the number of alarm signals that are generated.

10. The apparatus of claim 7 that further includes a bubble generator positioned at the gas inlet to the bubble chamber for controlling the mass displacement of the bubbles in the liquid.

11. Apparatus for detecting leaks in a hermetically sealed unit that includes
 a source of gas that is at a predetermined test pressure,
 a first flow circuit arranged to deliver gas from said source directly to a unit under test to raise the internal pressure of said unit to said test pressure,
 a second flow circuit for rerouting gas from said source through a liquid containing bubble chamber prior to delivery to said unit whereby a stream of bubbles is produced in the liquid in the event the test unit contains a leak,
 a waveguide passing vertically into said liquid that is partially immersed therein to encompass the bubble path,
 a radar unit positioned at the top of said waveguide for detecting the presence of bubbles within the waveguide and producing an output signal in response thereto, and
 valve means for selectively routing said gas between said first and said second circuit means.

12. The apparatus of claim 11 that further includes a bubble generator positioned at the gas inlet to the waveguide for metering gas into the liquid and thus controlling the mass displacement of the bubbles within the liquid.

13. The apparatus of claim 12 that further includes a plenum connected to the gas inlet of the bubble generator.

14. The apparatus of claim 11 that further includes a tuning means positioned in the waveguide for maximizing returns from the surface of the liquid.

15. The apparatus of claim 11 that further includes a comparator means connected to the output of the radar unit for comparing the output signal level to a predetermined threshold level and generating an alarm signal when the amplitude of the output signal exceeds the threshold level.

16. The apparatus of claim 15 that further includes a counter means connected to the output of the comparator means for recording the number of alarm signals that are generated within a given period of time.

* * * * *